US012308427B2

(12) United States Patent
Chul Lim et al.

(10) Patent No.: US 12,308,427 B2
(45) Date of Patent: May 20, 2025

(54) IRREVERSIBLE ADDITIVE COMPRISED IN CATHODE MATERIAL FOR SECONDARY BATTERY, CATHODE MATERIAL COMPRISING THE SAME, AND SECONDARY BATTERY COMPRISING CATHODE MATERIAL

(71) Applicant: LG Energy Solution, Ltd., Seoul (KR)

(72) Inventors: Sung Chul Lim, Daejeon (KR); Minchul Jang, Daejeon (KR); Insung Uhm, Daejeon (KR); Junghun Choi, Daejeon (KR); Hee Chang Youn, Daejeon (KR); Yonghee Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 528 days.

(21) Appl. No.: 17/615,456

(22) PCT Filed: Aug. 18, 2020

(86) PCT No.: PCT/KR2020/010972
§ 371 (c)(1),
(2) Date: Nov. 30, 2021

(87) PCT Pub. No.: WO2021/054621
PCT Pub. Date: Mar. 25, 2021

(65) Prior Publication Data
US 2022/0231291 A1    Jul. 21, 2022

(30) Foreign Application Priority Data

Sep. 20, 2019  (KR) .................. 10-2019-0116295

(51) Int. Cl.
*H01M 4/525*    (2010.01)
*H01M 4/04*    (2006.01)
(Continued)

(52) U.S. Cl.
CPC ......... *H01M 4/525* (2013.01); *H01M 4/0404* (2013.01); *H01M 4/505* (2013.01); *H01M 10/052* (2013.01)

(58) Field of Classification Search
CPC ...... H01M 4/525; H01M 4/404; H01M 4/505; H01M 10/052; H01M 4/0404
See application file for complete search history.

(56) References Cited

U.S. PATENT DOCUMENTS

2006/0251967 A1* 11/2006 Goh ................ H01M 4/525
429/223
2006/0257737 A1  11/2006 Goh et al.
(Continued)

FOREIGN PATENT DOCUMENTS

EP          1864344 B1    5/2018
JP          H06111821 A    4/1994
(Continued)

OTHER PUBLICATIONS

Shujie You, Zhi Li, Liuxiang Yang, Cheng Dong, Liangcheng Chen, Changqing Jin, Jingzhu Hu, Guoyin Shen, Hokwang Mao, High pressure induced coordination evolution in chain compound Li2CuO2, Journal of Solid State Chemistry, vol. 182, Issue 11, (Year: 2209).*
(Continued)

*Primary Examiner* — Matthew W Van Oudenaren
*Assistant Examiner* — Katherine N Higgins
(74) *Attorney, Agent, or Firm* — Lerner David LLP

(57) ABSTRACT

Provided is an irreversible additive contained in a cathode material for a secondary battery, wherein the irreversible additive being an oxide represented by the following Chemical Formula 1, and wherein the oxide has a monoclinic crystal structure, a cathode material including the same, and a secondary battery including the cathode material:

$$\text{Li}_{2+a}\text{Cu}_{1-b}\text{M}_b\text{O}_{2+c} \qquad (1)$$

(Continued)

in Formula 1, $-0.2 \leq a \leq 0.2$, $0 \leq b < 0.5$, $0 \leq c \leq 0.2$, and M is one or more elements selected from the group consisting of Ni, Mg, Pt, Al, Co, P, and B.

8 Claims, 2 Drawing Sheets

(51) Int. Cl.
  *H01M 4/505* (2010.01)
  *H01M 10/052* (2010.01)

(56) References Cited

U.S. PATENT DOCUMENTS

| | | | |
|---|---|---|---|
| 2020/0083525 | A1 | 3/2020 | Lee |
| 2021/0167396 | A1* | 6/2021 | Kazama ............ H01M 10/0525 |

FOREIGN PATENT DOCUMENTS

| | | | |
|---|---|---|---|
| JP | 2001160395 | A | 6/2001 |
| JP | 2001167766 | A | 6/2001 |
| JP | 2017168255 | A * | 9/2017 |
| JP | 2019003907 | A | 1/2019 |
| KR | 20060106772 | A | 10/2006 |
| KR | 20060111393 | A | 10/2006 |
| KR | 20190079534 | A | 7/2019 |
| WO | 2017119410 | A1 | 7/2017 |

OTHER PUBLICATIONS

English Machine Translation of JP 2017168255 A (Year: 2017).*
You et al. "High pressure induced coordination evolution in chain compound Li2CuO2," Journal of Solid State Chemistry, vol. 1823, Issue (Year: 2009).*
Extended European Search Report including Written Opinion for Application No. 20864744.6 dated Jun. 7, 2022, pp. 1-9.
Ruther, R. E. et al., "Synthesis, Structure, and Electrochemical Performance of High Capacity Li 2 Cu 0.5 Ni 0.5 O2 Cathodes", Chemistry of Materials, Sep. 16, 2015, pp. 6746-6754, vol. 27, No. 19. XP055679520.
Vitins, G. et al., "Li2CuO2 as an additive for capacity enhancement of lithium ion cells", Journal of Power Sources, Jun. 1, 2003, pp. 938-942, vol. 119-121, Elsevier, Amsterdam, NL. XP004430303.
Davidson, J. et al., "Short Range and Long Range Magnetic Order in 1T-Li2NiO2" Journal of Solid State Chemisrty, Dec. 1992, pp. 410-416, vol. 105.
Han, C. et al., "Enhanced cycling perlormance of surface-doped LiMn2O4 modified by a Li2CuO2—Li2NiO2 solid solution for rechargeable lithium-ion batteries," Electrochimica Acta, Accepted Manuscript, Jul. 2016, pp. 1-42.
International Search Report for Application No. PCT/KR2020/010972 mailed Dec. 2, 2020, 3 pages.
Kang, K. et al., "Synthesis, Electrochemical Properties, and Phase Stability of Li2NiO2 with the Immm Structure," Chemistry of Materials, Jun. 2004, pp. 2685-2690, vol. 16, American Chemical Society.
Lee, H. et al., "LhNiO2 as a Novel Cathode Additive for Overdischarge Protection of Li-Ion Batteries," Chemistry of Materials, Dec. 2007, pp. 5-7, vol. 20, American Chemical Society.
Lee, H. et al., Supporting Information, "Li2NiO 2 as a Novel Cathode Additive for Overdischarge Protection of Li-ion Batteries," Dec. 2007, 1 Page. http://pubs.acs.org.
Ohzuku, T. et al., "Electrochemistry and Structural Chemistry of LINI02 (R3M) for 4 Volt Secondary Lithium Cells," The Electrochemical Society, Jul. 1993, pp. 1862-1870, vol. 140.
Prakash, A. S. et al., "Synthesis, Phase Stability, and Electrochemically Driven Transformations in the LiCuO2—Li2CuO2 System", Chemistry of Materials, Jul. 2005, pp. 4406-4415, vol. 17, American Chemical Society.
Vitins, G. et al., "Li2CuO2 as an Additive in Positive Electrodes of Lithium Cells", Dept. of Chemistry, University of Southampton, Jun. 2003, 1 Page.
You, S. et al., "High pressure induced coordination evolution in chain compound Li2Cu02," Journal of Solid State Chemistry, Aug. 2009, pp. 3085-3090, vol. 182, Elsevier.

* cited by examiner

[FIG. 1]
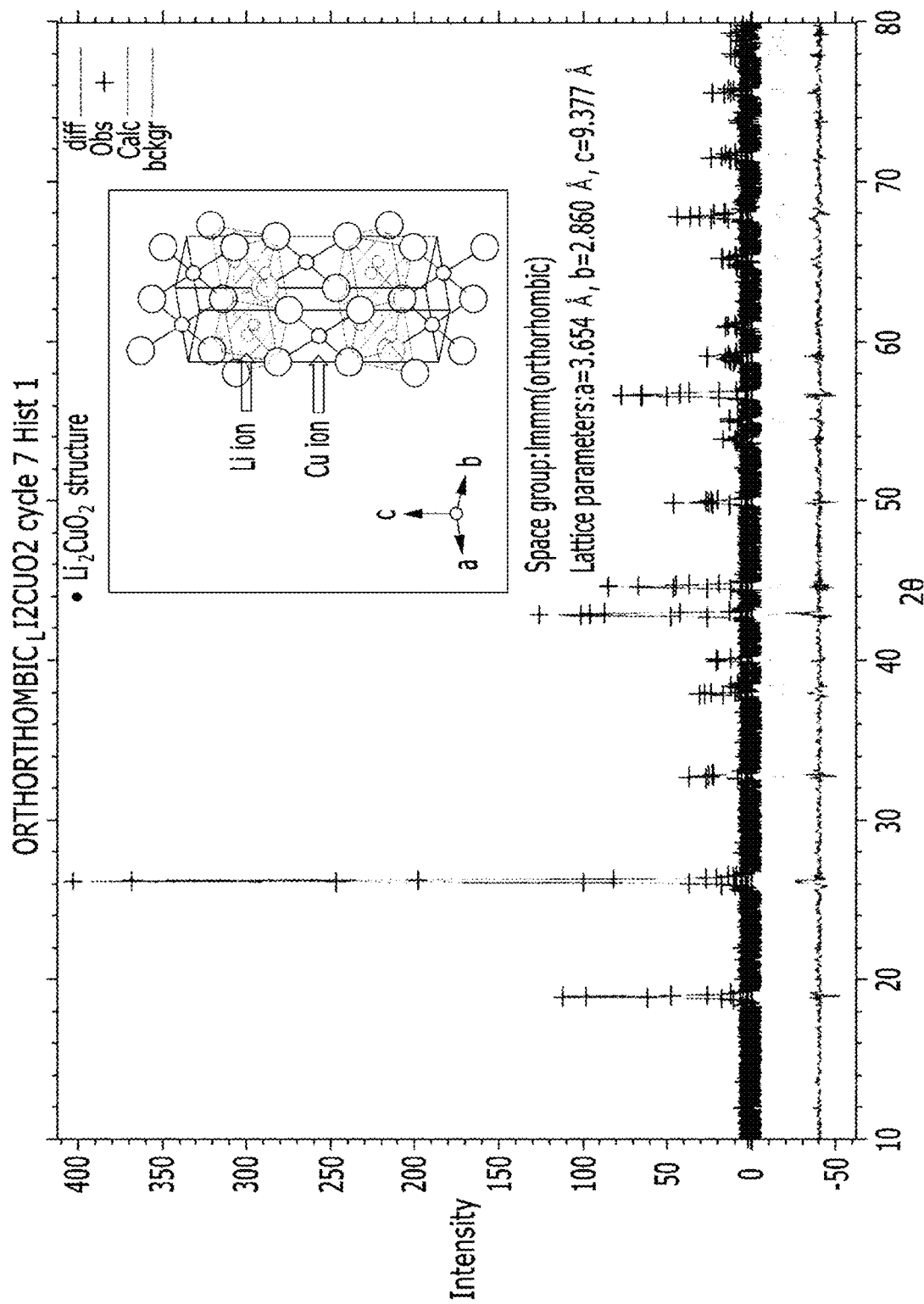

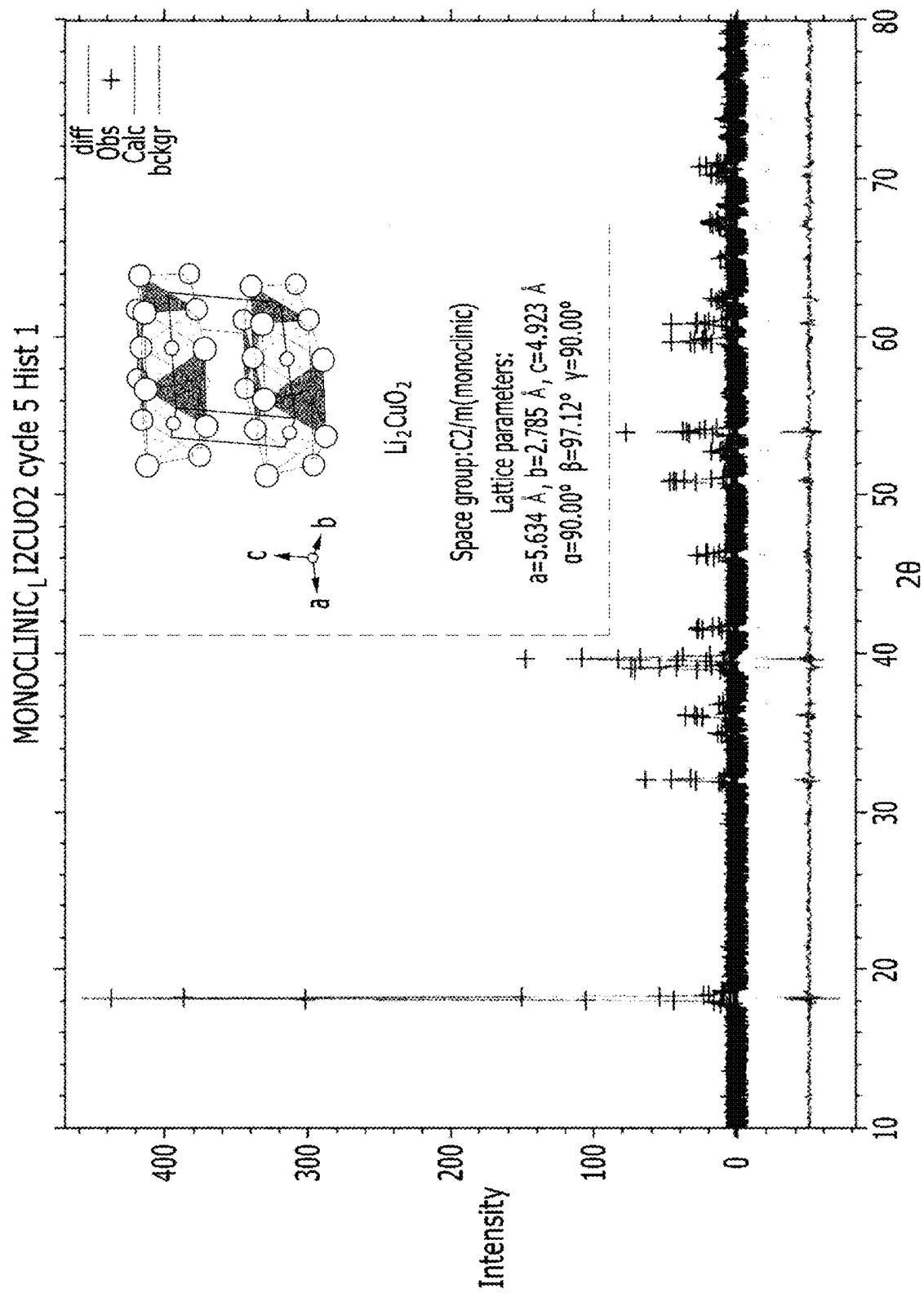

IRREVERSIBLE ADDITIVE COMPRISED IN CATHODE MATERIAL FOR SECONDARY BATTERY, CATHODE MATERIAL COMPRISING THE SAME, AND SECONDARY BATTERY COMPRISING CATHODE MATERIAL

CROSS CITATION WITH RELATED APPLICATION(S)

The present application is a national phase entry under U.S.C. § 371 of International Application No. PCT/KR2020/010972, filed Aug. 18, 2020, which claims priority from Korean Patent Application No. 10-2019-0116295 filed on Sep. 20, 2019, the disclosures of which are incorporated herein by reference in its entirety.

TECHNICAL FIELD

The present disclosure relates to an irreversible additive contained in a cathode material for a secondary battery that can minimize generation of impurities or gas, a cathode material including the same, and a secondary battery including the cathode material.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high energy density and operating voltage, a long cycle life, and a low self-discharge rate, and has been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Carbon materials are mainly used as an anode active material of such lithium secondary battery, and lithium transition metal composite oxide is used as a cathode active material of lithium the secondary battery. Among them, in addition to lithium cobalt composite metal oxides such as $LiCoO_2$ having high operating voltage and excellent capacity characteristics, various lithium transition metal oxides such as $LiNiO_2$, $LiMnO_2$, $LiMn_2O_4$ or $LiFePO_4$ have been developed.

Meanwhile, due to the consumption of Li ions during the initial stage of charging and discharging, the formation of a solid electrolyte interphase (SEI) layer and the irreversibility of cathode and anode ions can occur.

Consequently, the energy density is reduced, and there is a problem that the theoretical amount that can be designed cannot be sufficiently used.

In order to solve these problems, an irreversible additive was added to the cathode material to supplement lithium ions. However, $Li_2NiO_2$ or $Li_2CuO_2$, which is a commonly used irreversible additive, had an orthorhombic crystal structure and belonged to a space group of Immm. However, the above material has a problem of causing the generation of impurities or gas while undergoing three stages of structural changes in the operating voltage range after the initial charge of the secondary battery.

Specifically, the above material maintains an orthorhombic crystal structure in the range of 3.0 to 3.5V, but depending on the desorption of Li, the material undergoes three-stage crystal structure changes to the trigonal system at 3.5 to 4.0 V and to the monoclinic system at 3.5 to 4.25 V. A Li compound is generated therefrom, and when such a material is decomposed, there is a problem that impurities or gas may be generated.

Therefore, there is an urgent need for a technique for an irreversible additive that solves the above problems and does not cause generation of impurities or gas within the operating voltage range of the secondary battery, even while sufficiently expressing Li ions at the initial stage of charging.

DETAILED DESCRIPTION OF THE PRESENT DISCLOSURE

Technical Problem

The present disclosure has been designed to solve the above-mentioned problems, and an object of the present disclosure is to provide an irreversible additive that can minimize generation of impurities or gas in the working voltage range of a secondary battery, even while providing Li ions at the initial stage of charging to reduce irreversibility.

Another object of the present disclosure is to provide a cathode material for a secondary battery containing the irreversible additive, and a secondary battery exhibiting excellent electrochemical properties by including the same.

Technical Solution

It should be understood that the terms and wordings used herein should not be construed to be limited to general or lexical means, nor should the concepts of the terms be considered to be defining or describing the present disclosure made by the inventor(s) in the best way. Further, the terms and wordings should be constructed to have meanings and concepts that agree with the technical spirit of the present disclosure.

Through the following disclosure and examples, certain embodiments of an irreversible additive contained in a cathode material for a secondary battery, a cathode material including the irreversible additive, and a secondary battery including the cathode material, as well as a secondary battery including the same will be described. These particular described embodiments and examples are for illustration only and the present disclosure should not be considered to be limited to such embodiments and examples herein.

The irreversible additive contained in a cathode material for a secondary battery according to one embodiment of the present disclosure is an oxide represented by the following Chemical Formula 1, wherein the oxide has a monoclinic crystal structure:

$$Li_{2+a}Cu_{1-b}M_bO_{2+c} \quad (1)$$

in Formula 1, −0.2≤a≤0.2, 0≤b<0.5, 0≤c≤0.2, and

M is one or more elements selected from the group consisting of Ni, Mg, Pt, Al, Co, P, and B.

In this regard, $Li_2NiO_2$ or $Li_2CuO_2$ conventionally used in the art has an orthorhombic crystal structure, which is the most stable form, as described above, but when the material with such a crystal structure as described above is added, impurities or gas are generated within the working voltage range of the secondary battery, and thus there is a problem that the battery performance is rapidly deteriorated as the cycle proceeds.

As a result of repeated in-depth studies, the present inventors confirmed that the above causes occur as a result of undergoing three stages of crystal structure changes as mentioned above, and found out that when adding a material having a monoclinic system that does not change the crystal structure, the crystal structure does not change according to the voltage of the secondary battery within the operating voltage range of the secondary battery, and thus, it does not cause the problem of generation of impurities or gas as described above.

On the other hand, when the structure changes according to the voltage in the secondary battery, the structure changes as Li ions are desorbed. When the molar ratio of Li ions relative to the transition metal is 2, it has an orthorhombic system, and when the molar ratio is 1 relative to the transition metal, it changes to a trigonal system, and when the molar ratio is <1 relative to the transition metal, the inventors discovered that the crystal structure changes to a monoclinic system.

According to the present disclosure, the irreversible additive may have a monoclinic system while Li is an extra lithiated oxide with a molar ratio of about twice that of the transition metal, as is represented by Chemical Formula 1. More specifically, the irreversible additive may be $Li_2CuO_2$.

Further, particularly, the irreversible additive may belong to a space group of $C_{2/m}$, and more particularly, the crystal lattice of the oxide may be a=5.634 Å, b=2.785 Å, c=4.923 Å, α=90.00°, β=97.12°, γ=120.00°.

Such a material can be produced by synthesizing $Li_2CuO_2$ (orthorhombic system) by a solid-phase reaction method, and applying a high pressure of 18.9 GPa or more, specifically, 18.9 GPa to 32.5 GPa, to the material, as in the general method for producing $Li_2CuO_2$.

The solid-phase reaction method is performed by mixing a lithium raw material and a copper raw material, and then heat-treating them.

The heat treatment is performed at 650 to 800° C. for 12 to 36 hours under an air atmosphere. In the case of a wet preparation method, a drying process may be further included.

The preparation must be performed within the temperature and time of the heat treatment, so that the reaction between the lithium raw material and the copper raw material can sufficiently occur, and unreacted materials can be minimized.

As to the lithium raw material, lithium-containing oxides, sulfates, nitrates, acetates, carbonates, oxalates, citrates, halides, hydroxides or oxyhydroxides, and the like can be used, and specific examples thereof include $Li_2CO_3$, $LiNO_3$, $LiNO_2$, LiOH, LiOH·$H_2O$, LiH, LiF, LiCl, LiBr, LiI, $CH_3COOLi$, $Li_2O$, $Li_2SO_4$, $CH_3COOLi$, or $Li_3C_6H_5O_7$. Any one or a mixture of two or more of them may be used.

The copper raw material may be a copper-containing oxide or hydroxide such as copper oxide (CuO) or copper hydroxide ($Cu(OH)_2$).

The lithium raw material and the copper raw material may be used in an amount that satisfies the composition ratio of $Li_2CuO_2$.

Further, when mixing the above-mentioned raw materials, a sintering material may be optionally further added. Specifically, the sintering material may be: an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and any one or a mixture of two or more of them may be used. The sintering material may be used in an amount of 0.01 mol to 0.2 mol based on 1 mol of the nickel raw material. When used within the above-mentioned content range, since the sintering property is greatly improved, performance of the cathode material is improved and initial capacity of the battery is prevented from being deteriorated when the battery is charged/discharged.

Moreover, when mixing the above-described raw materials, a moisture-removing agent may be optionally further added. Specifically, the moisture-removing agent may be citric acid, tartaric acid, glycolic acid, maleic acid or the like; and any one or a mixture of two or more of them may be used. The moisture-removing agent may be used in an amount of 0.01 mol to 0.2 mol based on 1 mol of the nickel raw material.

Further, the pressurization of the powder prepared by the solid-phase reaction method may be performed by an angle dispersive X-ray diffraction (ADXD) high pressure experiment method.

Meanwhile, according to one embodiment of the present disclosure, there is provided a cathode material including the irreversible additive and a cathode active material.

Continuing with this embodiment, the content of the irreversible additive may be 0.1 wt % to 10 wt %, more specifically 1 wt % to 5 wt %, and more specifically 1 wt % to 3 wt % based on the total weight of the cathode material.

When the content of the irreversible additive is less than 0.1 wt % outside the above range, the compensation effect of anode efficiency due to the addition of an irreversible additive cannot be obtained, and when the content exceeds 10 wt %, problems such as volume expansion of the electrode due to the generation of impurities or gas, and deterioration of life may occur.

Further, according to one embodiment of the present disclosure, there is provided a secondary battery comprising a cathode in which a cathode material is coated onto a cathode current collector, wherein the cathode material includes an irreversible additive and a cathode active material, wherein the irreversible additive is an oxide represented by the following Chemical Formula 1, and wherein the oxide has a monoclinic crystal structure.

$$Li_{2+a}Cu_{1-b}M_bO_{2+c} \quad (1)$$

in Formula 1, −0.2≤a≤0.2, 0≤b<0.5, 0≤c≤0.2, and

M is one or more elements selected from the group consisting of Ni, Mg, Pt, Al, Co, P, and B.

Therefore, according to the present disclosure, when the oxide represented by Chemical Formula 1 having a monoclinic crystal structure is added as an irreversible additive, the crystal structure does not change according to the operation of the secondary battery, so that it is preferable to minimize generation of impurities or gas due to excessive desorption of Li during the operation of the secondary battery after charging at initial stage, which is not preferable.

In this case, the oxide having a monoclinic crystal structure may, specifically, belong to a space group of $C_{2/m}$.

On the other hand, the cathode active material contained in the cathode material may be, for example, $LiCoO_2$, $LiNiO_2$, $LiMnO_2$, $LiMn_2O_2$, $Li(Ni_aCo_bMn_c)O_2$ (0<a<1, 0<b<1, 0<c<1, a+b+c=1), $LiNi_{1-d}Co_dO_2$, $LiCo_{1-d}Mn_dO_2$, $LiNi_{1-d}Mn_dO_2$ (0≤d<1), $Li(Ni_aCo_bMn_c)O_4$ (0<a<2, 0<b<2, 0<c<2, a+b+c=2), $LiMn_{2-e}Ni_eO_4$, $LiMn_{2-e}Co_eO_4$ (0<e<2), $LiCoPO_4$, $LiFePO_4$, or the like, and any one or a mixture of two or more of them may be used.

Of these, in one particular example, the cathode active material may include an oxide represented by the following Chemical Formula 2.

$$Li(Ni_aCo_bMn_c)O_2 \quad (2)$$

in the above formula, 0<a<1, 0<b<1, 0<c<1, a+b+c=1.

In the oxide of Chemical Formula 2, the crystal structure easily changes from hexagonal to monoclinic while Li ions are desorbed and inserted in the operating voltage range of the secondary battery. Therefore, since the oxide can have a structure similar to that of the irreversible additive of the present disclosure within the operating range, it is more effective in the use of the irreversible additive according to the present disclosure.

More specifically, the oxide represented by Chemical Formula 2 may be contained in an amount of 80 wt % or more based on the total weight of the cathode active material.

The cathode material may further include a conductive material, a binder, a filler and the like, in addition to the cathode active material and the irreversible additive.

The conductive material is used to impart conductivity to the electrode, and in the battery to be configured, the conductive material can be used without particular limitation as long as it does not cause chemical changes and has electronic conductivity. Particular examples include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative. Any one alone or a mixture of two or more of them may be used. The conductive material may be included in an amount of 1 wt % to 30 wt % based on the total weight of the cathode material.

The binder plays a role of improving adhesion between the cathode active material particles and adhesive strength between the cathode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, recycled cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used. The binder may be included in an amount of 1 wt % to 30 wt % based on the total weight of the cathode material.

The cathode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, etc. may be used. In addition, the cathode current collector may have a thickness of 3 μm to 500 μm, and may have fine irregularities formed on the surface thereof to increase the adhesion of the cathode active material. For example, it may be used in various forms such as films, sheets, foils, nets, porous bodies, foams, and nonwoven fabrics.

The secondary battery may have a structure in which an electrode assembly is built in a battery case together with an electrolyte, with the electrode assembly including:
the cathode;
an anode in which an anode material including an anode active material is coated onto an anode current collector; and
a separator that is interposed between the cathode and the anode.

Specifically, the secondary battery may be a lithium secondary battery.

The anode may also be manufactured in a form in which an anode material including an anode active material is applied on an anode current collector, and the anode material may further include a conductive material and a binder as described above, together with an anode active material.

As the anode active material, a compound capable of reversibly intercalating and deintercalating lithium may be used. Specific examples thereof may include carbonaceous materials such as artificial graphite, natural graphite, graphitized carbon fibers and amorphous carbon; metallic substances capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ (0<x<2), $SnO_2$, vanadium oxide and lithium vanadium oxide; or a composite including the above metallic substance and the carbonaceous material such as a Si—C composite or a Sn—C composite, or the like, and any one or a mixture of two or more of them may be used. In addition, a metal lithium thin film may be used as the anode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, meso-carbon microbeads, mesophase pitches, and high-temperature calcined carbon such as petroleum or coal tar pitch derived cokes.

The anode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like may be used. In addition, the anode current collector may generally have a thickness of 3 μm to 500 μm, and, like the cathode current collector, may have fine irregularities formed on the surface thereof to enhance the bonding strength of the anode active material. For example, it may be used in various forms such as films, sheets, foils, nets, porous bodies, foams and nonwoven fabrics.

The separator separates the anode and the cathode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof may be used. In addition, a conventional porous nonwoven fabric, for example, a nonwoven fabric made of high melting point glass fiber, polyethylene terephthalate fiber, or the like may also be used. In addition, in order to secure heat resistance or mechanical strength, a coated separator containing a ceramic component or a polymer material may be used, and optionally, a single layer or a multilayer structure may be used.

In addition, the electrolyte used in the present disclosure may include, but is not limited to, an organic liquid electrolyte, an inorganic liquid electrolyte, a solid polymer electrolyte, a gel polymer electrolyte, a solid inorganic electrolyte, a molten inorganic electrolyte or the like which can be used in the preparation of a lithium secondary battery.

Specifically, the electrolyte may include an organic solvent and a lithium salt.

As to the organic solvent, any solvent may be used without particular limitation as long as it can serve as a medium through which ions involved in the electrochemical reaction of the battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (R is a straight, branched or cyclic C2-C20 hydrocarbon group, and may include a double-bond aromatic ring or ether bond); amides such as dimethylformamide; dioxolanes such as 1,3-dioxolane; or sulfolanes may be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the electrolyte may exhibit excellent performance.

Various lithium salts may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. It is preferable to use the lithium salt in a concentration rage of 0.1 to 2.0 M. If the concentration of the lithium salt is within the above range, since the electrolyte has an appropriate conductivity and viscosity, excellent electrolyte performance can be exhibited, and lithium ions can effectively move.

In order to improve the lifespan characteristics of the battery, suppress a reduction in battery capacity and improve discharge capacity of the battery, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride may be further added to the electrolyte in addition to the above electrolyte components. In this case, the additive may be included in an amount of 0.1 wt % to 5 wt % based on the total weight of the electrolyte.

The lithium secondary battery according to the present disclosure as described above may be used as a power source of devices in portable devices such as mobile phones, notebook computers, digital cameras, and electric vehicles such as hybrid electric vehicles (HEVs).

Advantageous Effects

In one particular exemplary embodiment, the irreversible additive according to the present disclosure is the oxide represented by Chemical Formula 1, and has a monoclinic crystal structure, so that within the operating voltage range of the secondary battery after charging at initial stage, the problem of generation of impurities or gas due to the desorption of excess Li ions can be significantly reduced. Accordingly, a lithium secondary battery manufactured by using a cathode material including the same can effectively compensate for irreversibility and also exhibit increased electrochemical characteristics and lifespan characteristics.

DETAILED DESCRIPTION OF THE EMBODIMENTS

FIG. 1 is a graph showing the XRD measurement results of Comparative Example 1 according to Experimental Example 1;

FIG. 2 is a graph showing the XRD measurement results of Example 1 according to Experimental Example 1.

DETAILED DESCRIPTION OF THE EMBODIMENTS

Various embodiments of the present disclosure will be described in detail with reference to the accompanying figures so that those skilled in the art can easily implement them. The present disclosure may be modified in various ways, and is not limited to the embodiments set forth herein.

Comparative Example 1

22.9 g of $Li_2O$ and 79.5 g of CuO (molar ratio 1:1) were mixed, and then heat-treated at 685 degrees Celsius for 18 hours under an $N_2$ atmosphere, and then the resulting reaction product was cooled to obtain irreversible additive particles $Li_2CuO_2$.

Example 1

$LiOH·H_2O$ having a purity of 95% or more and CuO having a purity of 99% or more were subjected to a solid-phase reaction method to synthesize an orthorhombic $Li_2CuO_2$ powder.

Specifically, the materials were mixed, pulverized, and then heat-treated at 420° C. for 8 hours under an air atmosphere, and then calcined at 700° C. for 36 hours to obtain a synthetic powder.

The synthetic powder was stored in a dry box, and subjected to ADXD of 20 GPa at room temperature using DAC to obtain a monoclinic Li$_2$CuO$_2$ powder.

In the ADXD, incident rays of 0.4066 Å wavelength are parallelized to a size of 10 and 50 μm in diameter, and the curette of the diamond anvil was 400 μm in diameter. The synthesized powder was pulverized and charged into 15 holes of a T301 stainless steel gasket. Silicone oil was used as the pressure transfer medium.

Experimental Example 1

2 g of the irreversible additive particles prepared in Comparative Example 1 and Example 1 were each collected as samples, and subjected to XRD analysis. The results are shown in FIGS. 1 and 2.

XRD analysis was measured with a Bruker XRD D4 instrument, and experiment was performed from 10 degrees to 80 degrees in 0.02 steps using a Cu source target.

Referring to FIGS. 1 and 2, it can be seen that Li$_2$CuO$_2$ having a different structure was formed according to Comparative Example 1 and Example 1.

Specifically, it can be seen that Comparative Example 1 is formed with an orthorhombic structure, and Example 1 is formed with a monoclinic crystal structure.

Comparative Example 2 and Example 2

Using the irreversible additives prepared in Comparative Example 1 and Example 1, a cathode and a lithium secondary battery were manufactured by the following method.

Specifically, the irreversible additive prepared in Comparative Example 1 and Example 1, LiNi$_{0.4}$Mn$_{0.3}$Co$_{0.3}$O$_2$ as a cathode active material, a carbon black conductive material and a PVdF binder were mixed in a weight ratio of 4.6:87.9:3.5:4 in an N-methylpyrrolidone solvent to prepare a cathode slurry. The slurry was coated onto an aluminum current collector, and dried and rolled to prepare a cathode.

In addition, MCMB (mesocarbon microbead), which is an artificial graphite mixed with 10 wt. % of SiO as an anode active material, a carbon black conductive material and PVdF binder were mixed in a weight ratio of 90:5:5 in an N-methylpyrrolidone solvent to prepare a composition for forming an anode, which was coated onto a copper current collector to prepare an anode.

A porous polyethylene separator was interposed between the cathode and the anode prepared as described above to manufacture an electrode assembly. The electrode assembly was placed inside the case, and then an electrolyte was injected into a case to manufacture a lithium secondary battery. At this time, the electrolyte was prepared by dissolving 1.15M lithium hexafluorophosphate (LiPF$_6$) in an organic solvent consisting of ethylene carbonate/dimethyl carbonate/ethylmethyl carbonate (EC/DMC/EMC mixing volume ratio=3/4/3).

Experimental Example 2

2 g of the irreversible additive particles prepared in Example 1 and Comparative Example 1 were each collected as samples, and their oxygen formation energies were measured. The results are shown in Table 1 below.

Specifically, the calculation of oxygen formation energy was performed based on the calculated value for DFT (density functional theory), PBE functional PAW_PBE pseudopotential Hubbard U term for Ni=6.2 eV, cut-off energy=520 eV, calculation model: supercell with Li$_{48}$Cu$_{24}$O$_{48}$ atoms, oxygen vacancy (VO) production concentration=1/48 (~2.1 at. %) O$_2$ gas (O-rich environment).

TABLE 1

| | Oxygen (V$_O$) formation energy (eV) |
|---|---|
| Comparative Example 1 | 2.82 |
| Example 1 | 2.87 |

Referring to Table 1, considering that the energy of the monoclinic crystal irreversible additive of Example 1 is higher than that of the orthorhombic system of Comparative Example 1, it is presumed that the structure change in the intercalation of Li ions during charging and discharging is more robust than the orthorhombic system. Therefore, when used for a cathode as in Example 2 and Comparative Example 2, it is expected that the monoclinic crystal irreversible additive will cause less side reactions than orthorhombic irreversible additives.

The invention claimed is:

1. A cathode material for a secondary battery, comprising:
a cathode active material and an irreversible additive,
the irreversible additive being an oxide represented by the following Chemical Formula 1,
wherein the oxide has a monoclinic crystal structure prior to an initial charge of the secondary battery, $$Li_{2+a}Cu_{1-b}M_bO_{2+c} \quad (1)$$

in Formula 1, −0.2≤a≤0.2, 0≤b<0.5, 0≤c≤0.2, and
M is one or more elements selected from the group consisting of Ni, Mg, Pt, Al, Co, P, and B
wherein the cathode active material comprises an oxide represented by the following Chemical Formula 2, $$Li(Ni_aCo_bMn_c)O_2 \quad (2)$$

in Formula 2, 0<a<1, 0<b<1, 0<c<1, a+b+c=1.

2. The cathode material according to claim 1, wherein the oxide belongs to a space group of C$_{2/m}$.

3. The cathode material according to claim 1, wherein the oxide has a crystal lattice of a=5.634 Å, b=2.785 Å, c=4.923 Å, α=90.00°, β=97.12°, γ=120.00°.

4. The cathode material according to claim 1, wherein the oxide is Li$_2$CuO$_2$.

5. The cathode material according to claim 1, wherein a content of the irreversible additive is 0.1 wt % to 10 wt % based on the total weight of the cathode material.

6. A secondary battery comprising a cathode including a cathode material, the cathode material coated onto a cathode current collector,
wherein the cathode material includes an irreversible additive and a cathode active material, wherein the irreversible additive is an oxide represented by the following Chemical Formula 1,
wherein the oxide has a monoclinic crystal structure prior to an initial charge of the secondary battery, $$Li_{2+a}Cu_{1-b}M_bO_{2+c} \quad (1)$$

in Formula 1, −0.2≤a≤0.2, 0≤b<0.5, 0≤c≤0.2, and
M is one or more elements selected from the group consisting of Ni, Mg, Pt, Al, Co, P, and B,
wherein the cathode active material comprises an oxide represented by the following Chemical Formula 2, $$Li(Ni_aCo_bMn_c)O_2 \quad (2)$$
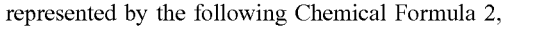

in Formula 2, 0<a<1, 0<b<1, 0<c<1, a+b+c=1.

7. The secondary battery according to claim 6, wherein the secondary battery has a structure in which an electrode assembly is built in a battery case together with an electrolyte, with the electrode assembly including:
   the cathode;
   an anode in which an anode material including an anode active material is coated onto an anode current collector; and
   a separator that is interposed between the cathode and the anode.

8. The secondary battery according to claim 6, wherein the secondary battery is a lithium secondary battery.

* * * * *